United States Patent
Rembe et al.

(10) Patent No.: US 7,852,487 B2
(45) Date of Patent: Dec. 14, 2010

(54) HETERODYNE INTERFEROMETER DEVICE FOR OPTICALLY MEASURING AN OBJECT

(75) Inventors: Christian Rembe, Waldbronn (DE); Alexander Drabenstedt, Ettlingen (DE); Georg Siegmund, Karlsbad (DE)

(73) Assignee: Polytec GmbH, Waldbronn (DE)

( * ) Notice: Subject to any disclaimer, the term of this patent is extended or adjusted under 35 U.S.C. 154(b) by 145 days.

(21) Appl. No.: 12/040,030

(22) Filed: Feb. 29, 2008

(65) Prior Publication Data

US 2008/0285049 A1    Nov. 20, 2008

(30) Foreign Application Priority Data

Mar. 3, 2007   (DE) ........................ 10 2007 010 389

(51) Int. Cl.
*G01B 9/02* (2006.01)

(52) U.S. Cl. .................................................... 356/486

(58) Field of Classification Search ................. 356/479, 356/486, 497, 498
See application file for complete search history.

(56) References Cited

U.S. PATENT DOCUMENTS

| | | | |
|---|---|---|---|
| 4,818,110 A | | 4/1989 | Davidson |
| 6,195,168 B1 | | 2/2001 | De Lega et al. |
| 6,906,806 B2 * | | 6/2005 | Mermelstein ............... 356/497 |
| 2008/0304075 A1 * | | 12/2008 | Rembe ....................... 356/457 |

FOREIGN PATENT DOCUMENTS

| | | |
|---|---|---|
| DE | 4108944 | 9/1992 |
| DE | 4404154 | 8/1995 |
| DE | 4429578 | 6/1996 |
| DE | 19721883 | 2/1998 |
| DE | 19733890 | 2/1998 |
| DE | 10047495 | 10/2001 |
| DE | 10131779 | 2/2002 |
| DE | 102005023212 | 11/2006 |

* cited by examiner

*Primary Examiner*—Hwa S. A Lee
(74) *Attorney, Agent, or Firm*—Volpe and Koenig, P.C.

(57) ABSTRACT

A device for the optic measuring of an object (1), including a signal processing unit (2) as well as an interferometer with a light source (3) and with at least one detector (4a, 4d). The interferometer is embodied such that a light beam (12) created by the light source (3) is split at least into a working beam (12a) and a reference beam (12b), with the working beam (12a) impinging the object (1) and the working beam (12a) is at least partially reflected by the object and interfered with the reference beam (12b) on the detector (4a, 4b). The signal processing unit (2) is connected to the detector (4a, 4b) and includes a vibrometer processing unit (2f), which detects the motion of the object (1) from the measuring signals of the detector (4a, 4d). It is essential that the light source (3) creates light with a coherence length shorter than 1 cm and that the interferometer comprises a device for changing the optic path length (11), and the signal processing unit comprises a focus control (2d) controlling a device for changing the optic path length which controls the device for changing the optic path length such that the optic path length of the working beam and the reference beam are approximately adjusted to each other.

17 Claims, 4 Drawing Sheets

HETERODYNE INTERFEROMETER DEVICE FOR OPTICALLY MEASURING AN OBJECT

CROSS-REFERENCE TO RELATED APPLICATIONS

This application claims the benefit of DE 10 2007 010 389.3, filed Mar. 3, 2007, which is incorporated herein by reference as if fully set forth.

BACKGROUND

The invention relates to a device for optically measuring an object.

Such devices comprise an interferometer with a light source and a detector. The light source emits a light beam, that is typically split via a beam splitter in the interferometer into a working beam and a reference beam. The working beam is guided to a measuring spot on the object to be measured, if necessary via additional optic components, such as mirrors or lenses. The working beam is at least partially reflected at the object, returns into the beam path of the interferometer, and is guided to the detector.

The reference beam is also guided to the detector, so that on the detector interference occurs between the working beam and the reference beam.

The detector is connected to a signal processing unit, which determines motion data of the object from the measuring signals of the detector. This is possible because the working beam is influenced by a motion of the object based on the Doppler-effect and thus by evaluating the detector signals conclusions can be drawn for the motion of the object, for example the speed of motion. Such devices are usually called Laser-Doppler vibrometers or simply vibrometers.

SUMMARY

The invention is based on the object of improving the measurement quality of known vibrometers, in particular by avoiding unwanted signals, as well as to expand the scope of functions of known devices. Furthermore, the invention is to simplify and/or accelerate the measuring process.

This object is attained in a device according to the invention. Advantageous embodiments of the device according to the invention are described below.

The light sources of the known prior art vibrometers are typically embodied as Lasers creating an essentially coherent light beam. This means that after splitting the light beam into working beams and reference beams, an interference of the two beams is possible regardless whether or not the optic path lengths of the two beams are identical.

The device according to the device therefore generally differs from previously known vibrometers in that the light source creates light with a coherence length shorter than 1 cm.

The statement of a coherence length is a typical measurement for the coherence. The coherence length is defined in that the intensity of the interference signal of the working beam and the reference beam received by the photo detector is recorded depending on the different lengths of the optic path lengths of the working beam and the reference beam between the light source and the detector. When the lengths have been adjusted to each other, i.e. the optic path length of the working beam and the reference beam between the light source and the detector are identical, a maximum interference and accordingly a maximum interference signal result. The greater the difference between the optic paths length of the working beam and the reference beam the lower the intensity of the optic interference signal.

The effective coherence length depends on the band width within which the strength of the interference signal is determined. For typical devices to optically measure an object, the coherence length is defined as the difference of the optic path lengths between the measuring signal and the reference signal, at which the interference signal has dropped from an initial maximum to $1/e^2$ of the maximum value. In presently known Laser-Doppler vibrometers, the strength of the interference signals is usually measured at a band width of 70 MHz, while the coherence length is usually measured at a band width for the strength of the interference signal <50 Hz.

The use of light having a coherence length shorter than 1 cm is advantageous in that a selection of the measurement range is possible using the coherence length: essentially a good reading interference of the working beam and the reference beam occurs only at the interference on the detector when the optic path lengths traveled by the working beam and the reference beam between the light source and the detector differ by less than one coherence length. However, here such portions of the reflected working beam fail to contribute to an interference signal, which have a considerably longer or considerably shorter optic path length in reference to the reference beam.

When, for example, an object is measured the path lengths of the working beam and the reference beam are adjusted to each other such that a working beam overall reflected by the surface of the object (i.e. from the light source via the object surface to the detector) has approximately the same optic path length as the reference beam (from the light source to the detector).

When portions of the working beam are reflected by disturbing objects, such as for example dust or an encapsulation of an object to be measured, generally the optic path length from the light source via the disturbing object to the detector is different from the one of the reference beam, i.e. the optic path lengths are not adjusted to each other for this portion of the working beam. Therefore the portion of the working beam reflected by the disturbing object, as described above, contributes only to an irrelevant extent to the interference signal and any falsification of the measurement is avoided.

Therefore, the use of light having a limited coherence length determines a measurement range, within which measuring signals contribute to the interference signal, while outside said measurement range reflections of the working beam influence the measurement result only to an irrelevant extent.

By using light having a coherence length shorter than 1 cm it is therefore necessary to adjust the optic path lengths of the working beam and the reference beam to each other. The device according to the invention comprises therefore a device for changing the optic path. Using the device to change the optic path length, the ratio of the optic path lengths of the working beam and the reference beam can be changed. The focal control controls the device for changing the optic path lengths such that the working beam and the reference beam are adjusted to each other, i.e. show the same optic path length.

In this manner, it is ensured that the measuring occurs with the optic path lengths being adjusted to each other between reference beam and working beam and thus the signal noise ratio is optimized for measuring motions and thus measuring errors are minimized.

Here the comparison of optic path lengths can occur by different means:

In a preferred embodiment the device for changing the optic path lengths is arranged in the beam path of the reference beam. The focal control regulates the device for changing the optic path length only in that the optic path length of the reference beam (from the light source to the detector) is changed such that it coincides with the optic path length of the working beam (from the light source via the object to the detector), so that when measuring the two optic path lengths they are adjusted to each other. For example the device for changing the optic path lengths can be implemented such that a mirror is arranged in the path of the reference beam which can be displaced in the direction of the beam via a motor so that by a displacement of the mirror, the optic path length of the reference beam can be varied.

Similarly, in another preferred embodiment, an adjustment of the optic path lengths to each other can occur by an arrangement of the device for changing the optic path lengths in the beam path of the working beam.

The scope of the invention also includes to change the position of the object in reference to the interferometer via an object carrier unit such that the focal control can change the position of the object in reference to the interferometer via the object carrier unit and thus the optic path length of the working beam, and this way an adjustment of the optic path lengths of the working beam and the reference beam to each other is possible in this preferred embodiment.

Furthermore, the scope of the invention also includes that the device comprises several detectors, and the working beam and the reference beam each must be split into several partial beams, with each working beam being interfered in a detector with one reference beam each. In this case, the device for changing the optic path length is arranged in the beam path of one or more partial beams of the working beam or the reference beam such that the individual pairs of working beams and reference beams are each provided with a different ratio of optic paths lengths.

In this case the device for changing the optic path length comprises a signal selection unit, which is connected to detectors and to the signal processing unit. The focal control regulates the signal processing unit such that the signals of the detector with the optic path lengths being adjusted to each other are forwarded to the signal processing unit. In this preferred embodiment therefore no adaptive adjustment of the optic path lengths occurs, rather the adjustment occurs such that from several pairs of working beams and reference beams, that pair is selected which is provided with optic paths adjusted to each other and/or shows the smallest difference in optic path lengths.

Of course, the scope of the invention also comprises combinations of two or more of the above-mentioned possibilities in a device.

In a preferred embodiment the focus control is embodied such that the distance of the object to be measured from the interferometer can be predetermined. The optic path length of the working beam inside the interferometer is predetermined by design and is stored in the focal control. The focal control now calculates the optic path length of the working beam (i.e. the optic path length within the interferometer plus twice the distance between the interferometer and the measuring object) and controls the device for changing the optic path length such that the working and the reference beam are adjusted to each other.

Advantageously the comparison of the optic path lengths is performed depending on the detector signal.

In a preferred embodiment, the focal control is connected to the detector and controls the device for changing the optic path length depending on the measuring signal of the detector such that the optic path lengths of the working beam and the reference beam are adjusted to each other.

Advantageously, in this embodiment the adjustment is performed depending on an intensity signal, i.e. the intensity of the interference signal of the working beam and the reference beam. The signal processing unit of the device according to the invention evaluates the measuring signal of the detector with regard to the intensity of the interference signal of the measuring signal and the reference signal. The focal control controls the device for changing the optic path lengths such that the intensity is maximized, because at maximum intensity of the interference signal the working beam and the reference beam the optic path lengths of the two beams are adjusted to each other.

The calculation of the intensity of the interference signal from the signal of the detector can occur by methods known per se, such as described for example in C. Rembe, A. Drabenstedt, "The Laser-scanned Confocal Vibrometer Microscope: Theory and Experiments", Rev. Sci. Instrum., 77 083702 (2006).

Advantageously, the interferometer of the device according to the invention comprises a heterodyne interferometer. In the heterodyne measuring method, the frequencies of the working beam and the reference beam are adjusted to each other, so that from the interference signal not only the speed of the motion but also the direction of the motion can be determined. Typically a heterodyne interferometer is provided with a frequency shift unit, which is allocated in the beam path of the working beam or the reference beam. Now, the frequency of either the working beam or the reference beam is shifted via the frequency shift unit so that from the interference signal, the direction of motion can be determined by the vibrometer processing unit.

In this advantageous embodiment, the interference signal is therefore provided with a frequency that is equivalent to the frequency shift created by the frequency shift unit. Accordingly, in this advantageous embodiment, the signal processing unit is embodied such that it determines the intensity of the interference signal from the envelope of the interference signal, i.e. from the signal intensity of the heterodyne carrier of the interference signal, typically having a measuring band width of 70 MHz.

The light source of the interferometer is embodied such that it creates light having a limited coherence length. As described above, the interference of working beam and the reference beam occurs on the detector only with a well readable interference when the optic paths of the reference beam and the working beam differ by less than the optic coherence length. The optic coherence length therefore also predetermines a range of depths on the object within which the reflecting working beam contributes to a measuring signal.

The light source is therefore advantageously embodied such that it creates a light beam having a coherence length shorter than 50 µm so that no disturbing effects caused by diffused light contributes to the interference signal. It is particularly advantageous to select a coherence length shorter than 20 µm, in particularly shorter than 10 µm.

The creation of light having a predetermined coherence length can occur by various means. In particular it is advantageous to embody the light source as a super-luminescence diode. It is also possible to impinge the phase of a Laser or a Laser diode with noise. Further it is possible to use a femtosecond Laser.

The device according to the invention is particularly well suited to measure encapsulated objects. Here, it is advantageous to select the light source such that the light beam is not or only slightly absorbed by the encapsulation so that the working beam impinges the encapsulated object almost at original intensity. In particular, micro systems are frequently encapsulated with silicon or materials containing silicon. Due to the fact that the absorption of light by silicon drops considerably for wave lengths longer than 1,000 nm it is advantageous to provide the light source such that it creates light having a wavelength longer than 1,000 nm, in particular with a wavelength ranging from 1,500 to 2,500 nm, most particularly having a wavelength of 1,550 nm.

After an adjustment of the path lengths using the device according to the invention, three types of data can be stored for the measuring point to be measured.

Firstly, the path necessary to adjust the working beam and the reference beam to each other using the device for changing the optic path length can be stored. Secondly, the motion data determined for the measuring point can be saved, and thirdly the intensity of the measuring signal can be stored for the measuring point.

When the measurement object is partially transparent, i.e. provided with a refraction number varying in depth in reference to light, a three-dimensional image of the measuring object can also be determined using the device according to the invention.

For this purpose, as described above, a certain measurement range is "crossed", in which for differently predetermined depth positions (i.e. different distances of the measuring range from the interferometer) the reference beam and the working beam are adjusted to each other in the measuring object. Therefore a measurement depending on the penetrating depth can be performed, so that the intensity signals measured reflect a three-dimensional image of the measuring object. The device according to the invention comprises therefore the functionality of the optic coherence tomography.

Additionally, at arbitrary depth positions, in particular at positions provided with a local maximum of the intensity signal, oscillation measurements can occur as described above so that simultaneously a three-dimensional image of the object to be measured is given as well as motion data depending on the depth of the measuring object.

After scanning several measuring points on the object (e.g., via a scanner control unit as described in the following) a surface profile of the object to be measured can be determined from the path data, with for each point measured additional motion data is given so that even three-dimensional motion processes, i.e. in particular vertical ("out of plane") and parallel ("in plane") in reference to the working beam, can be calculated form the data using correlation methods known per se.

For determining the quantitative motion information from the measurement data here, in a manner known, methods can be used to analyze in-plane motions, such as described in T. Preusser, M. Rumpf, "Extracting Motion Velocities from 3D Image Sequences and Coupled Spatio-Temporal Smoothing", SPIE Conferences on Visualization and Data Analysis, SPIE Vol. 5009, p. 181-192, and L. Alvarez, J. Weickert, J. Sanchez, "A Scale-Space Approach To Nonlocal Optical Flow Calculations", Scale-Space 1999, Corfu, Greece, September 1999, Lecture Notes in Computer Science, 1682, pp. 235-246, Springer 1999.

In a preferred embodiment, the device according to the invention is embodied for an optic measuring of an object using a multi-beam interferometer. Here a working beam multiplier is arranged both in the beam path of the working beam as well as in the beam path of the reference beam, so that the working beam and the reference beam are each split into at least two partial beams.

The interferometer further comprises at least a second detector, with the first and the second detector being arranged such that the first reference beam is overlapped with the first measuring beam on the first detector and the second reference beam is overlapped with the second working beam on the second detector.

The signal processing unit is both connected to the first as well as the second detector. Therefore the measurement signals of both detectors can be evaluated both with regard to their intensity of the respective detector signal and with regard to the motion data. Advantageously the signal processing unit is here embodied such that the two signals can be evaluated simultaneously.

In a preferred embodiment, the two measuring beams are emitted separately from the device according to the invention so that they can be aligned to two locally different measuring points on the object to be measured. Therefore, in this embodiment simultaneously two different points on the object can be measured.

In a preferred further embodiment of the previously described multi-beam interferometer, the interferometer is provided with at least one second device for an optic path length adjustment, which is arranged in the beam path of one of the partial reference beams. In this embodiment it is therefore possible to change the optic path length of both reference beams using the first device for optic path lengths adjustment while the optic path length of only one of the two reference beams is changed using the second device for optically changing the path length, so that a path length difference between the reference beams can be predetermined.

Here, it is particularly advantageous for the device according to the invention to be embodied such that only one measuring path leaves the device according to the invention. This can be achieved by at least two working beams leaving the optic device via an identical path and thus also impinge the object to be measured at a locally identical measuring point.

Advantageously, the device is embodied such that the working beam is only divided after the reentry into the interferometer. Therefore, a working beam is created emitted by the device, which is at least partially reflected by the measuring object, and subsequently it reenters the device according to the invention. After the reentry into the device according to the invention the working beam passes a beam multiplier and is split into at least two working beams, each of which being interfered with a corresponding reference beam on one detector each.

This embodiment offers the advantage that for one measuring point on the measuring object, interference signals are given for at least two detectors, with the path length difference between the working beam and the reference beam being different for the two detectors and this difference can be predetermined by the second device for adjusting optic path lengths.

In this way, simultaneously two measuring signals are given with a different adjustment of the optic path length between the reference beam and the working beam, without an optic path length having to be "crossed" as described above, i.e. without the need to evaluate several temporarily subsequent measuring signals by varying the optic path length.

Therefore, among the two detector signals the one with the higher intensity can be chosen without requiring the time-consuming crossing of the optic path length to find the maximum intensity signal.

Of course, a combination of the two methods is also possible, in which by the first device the optic path lengths of the two reference beams are roughly adjusted to each other and subsequently the signals of the two detectors are read and the maximum interference signal therefrom is processed.

Here, it is particularly advantageous when working beams and reference beams are split into a greater number of working beams and reference beams so that they can be interfered on a respectively greater number of detectors. The reference beams are each provided with a descending sequence by appropriate devices for an optic path length extension using a different optic path length so that simultaneously a greater number of measuring signals can be read by the signal processing unit for different path length ratios between reference beams and working beams. This way the interference signal can be found for working beams and reference beams adjusted to each other without at least the first devices for an optic path length extension performing a path length extension. Alternatively, the differences caused by the second device for optically extending the path length is staggered narrowly so that after a rough adjustment using the first device for changing the optic path length a fine resolution of different ratios of optic path lengths is given.

Advantageously the device according to the invention comprises at least 50, particularly at least 100 detectors (with working beams and reference beams being split into appropriately many beams) so that simultaneously measuring signals are detected with 100 different adjustment ratios between the working beam and the reference beam.

Advantageously, the second device for optically changing the path length is embodied as an optic delay unit. This can occur, for example, in that the respective reference beam being guided through a denser optic medium and thus slowed down. Therefore, compared to the undelayed reference beam a temporal off-setting results, which is equivalent to a different optic path lengths.

In another preferred embodiment, the device comprises a displacement unit and a scanner control unit. This allows a grid-like measuring of several locally different measuring points predetermined on a measurement object.

The scanner control unit controls the displacement unit such that the relative position of the object to be measured and the working beam is adjusted. This way the working beam can be aligned to at least two predetermined, locally different measuring points on the object.

The displacement unit can be arranged on the object, for example in the form of an X-Y-table, which can displace the object essentially in two spatial directions vertically in reference to the working beam. However, it is also possible to arrange the displacement unit in the radiation path of the working beam such that the working beam can be deflected to the predetermined points of the measuring object.

In this advantageous embodiment, a surface topography of the object to be measured can be created after the scanning of the object by a path difference saved for each measuring point for comparing working beams and reference beams.

In particular for measuring objects of micro technology, e.g., rotation sensors, acceleration sensors, and pressure sensors encapsulated in silicon, it is advantageous when the device is embodied as a confocal microscope. The working beam is here focused via a lens onto the measuring point of the object to be measured. The working beam at least partially reflected by the object reenters the confocal microscope via the beam path of the lens. The device is further provided with a spatial filter, which is arranged in the beam path of the working beam such that non-focal beams impinging the object from points outside the focus of the object are essentially shielded by the spatial filter.

Typically such a spatial filter can be implemented by a pinhole which is arranged in the beam path of the working beam.

BRIEF DESCRIPTION OF THE DRAWINGS

In the following, two exemplary embodiments of the invention are described and explained in greater detail using the attached drawings. Shown are.

DETAILED DESCRIPTION OF THE PREFERRED EMBODIMENTS

Figure 1A:
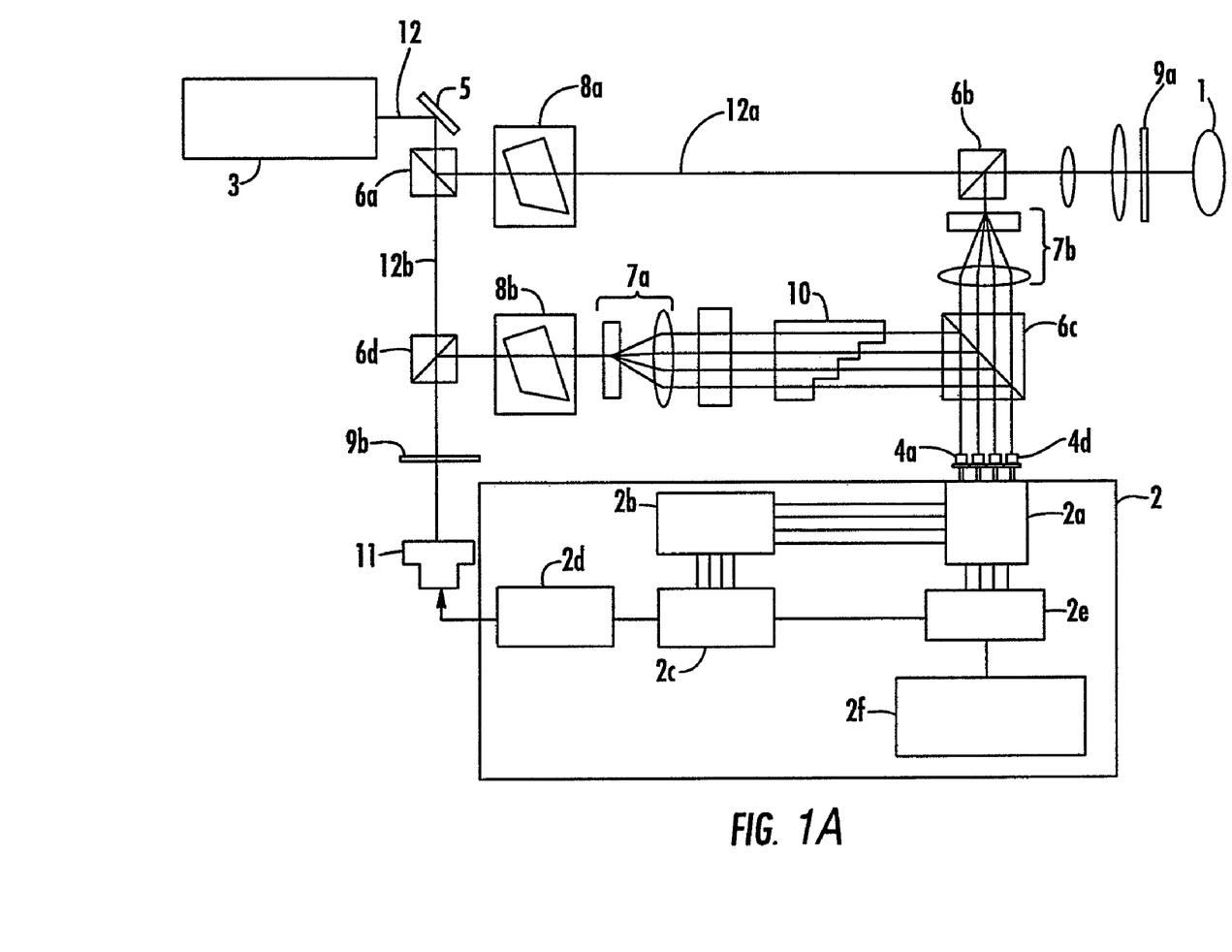
FIG. 1A is a diagram of an exemplary embodiment of the device according to the invention for optically measuring an object, in which the optic path length of the reference beam is changed and the interferometer is embodied as a multi-beam interferometer.

FIG. 1A shows a device according to the invention for the optic measurement of the object 1. It comprises a signal processing unit 2, as well as an interferometer with a light source 3, and a total of 100 detectors, of which only four are shown arranged in a horizontal line and the exterior two are marked with the reference characters 4a and 4d.

The interferometer further comprises a deflection mirror 5, four beam splitters 6a through 6d, two beam multipliers 7a an 7b, two Bragg cells 8a and 8b, two λ/4-plates 9a and 9b, an optic delay unit 10, and a reference mirror 11 that can be displaced by a motor.

The light source 3 is embodied such that it creates light with a coherence length amounting to approximately 20 μm. The light beam 12 emitted by the light source is deflected to the beam splitter 6a via a deflection mirror 5. Here it splits into a working beam 12a and a reference beam 12b. The working beam 12a travels through the Bragg cell 8a, the second beam splitter 6b, and is focused to the measurement object 1 via lenses over the λ/4 plates 9a.

The working beam 12a, at least partially reflected by the object 1, again passes through the λ/4 plate 9a, is deflected to the beam multiplier 7b by the second beam splitter 6b, and impinges the four detectors 4a through 4d after passing the beam multiplier 7b and the third beam splitter 6c.

The light source creates a polarized light so that deflection of the light beams without any loss in intensity is possible via the λ/4 plates 9a and 9b in cooperation with the polarization beam splitters.

The interferometer of the exemplary embodiment is embodied as a heterodyne interferometer: via the two Bragg cells 8a and 8b the working beam 12a and the reference beam 12b are detuned in reference to each other with regard to frequency.

The reference beam 12b passes the fourth beam splitter 6d and impinges the reference mirror 11 that can be displaced by a motor, is reflected here, and is deflected to the second Bragg cell 8b by the fourth beam splitter 6d. Subsequently the reference beam 12b is fanned by the beam multiplier 7a and passes the optic delay unit 10. Here, the individual partial beams are each delayed to a different extent, so that each of the partial beams can be allocated to a different optic path length after passing the optic delay unit 10.

The fanned reference beam is deflected to the 100 detectors (only detectors 4a through 4d are shown here) via the third beam splitter 6c and here it is interfered with the fanned working beam 12a. Therefore, here for each detector a different adjustment ratio is given of the working beam in reference to the reference beam.

The signal processing unit 2 is connected to the detectors (detectors 4a through 4d are shown) and to the reference mirror 11 that can be automatically adjusted by the motor. The signal processing unit comprises the following components: a signal splitter 2a, an analogue digital (AD)-data receiver 2b, a signal intensity evaluation 2c, a focus control 2d, a multiplexer 2e, and a vibrometer processing unit 2f.

Via the signal splitter 2a the measuring signals of the detectors (4a through 4d are shown) are guided, on the one hand, to the AD-data receiver 2b and, on the other hand, to the multiplexer 2e.

The AD-data receiver 2b is embodied such that the signal strength of the outlet signals of each detector is determined and converted into a digital signal. Here the signal intensity means that the present strength of the interference signal is determined from the cover of the output signal created by the respective detector.

The digitally provided signal strength is evaluated in multiple ways in the signal evaluation 2c.

On the one hand, the signal strength of the strongest signal is forwarded to the focus control 2d. Furthermore, the channel number, i.e. the number of the detector having the strongest signal, is forwarded to the multiplexer 2e.

The measuring process occurs as follows:

By the optic delay unit 10 each of the detectors is allocated to a different delay of the reference beam.

Using the focus control 2d the motor of the reference mirror 11 is controlled such that a maximum measuring signal is connected to a detector having a mean delay between the working beam and the reference beam. For this detector therefore the working beam and the reference beam are approximately adjusted to each other. This way a rough adjustment is performed.

As soon as this adjustment of the optic path lengths of the reference beam has been performed the signal strength evaluation 2c forwards the channel number of the channel having the strongest detector signal to the multiplexer 2e. The multiplexer 2e forwards the interference signal of the detector, having the strongest interference signal to the vibrometer evaluation unit 2f.

The vibrometer processing unit evaluates the forwarded interference signal in a manner known per se, i.e. it determines the motion speed and the direction of the motion of the measuring point on the object 1 to be measured and saves this data.

For the first time the device according to the invention shown in FIG. 1 can measure both the intensity of the interference signal of the object 1 as well as the motion speed and the direction of the motion of the measuring point on the object 1 to be measured. Based on a limited coherence length of the light source 3 only such light reflections of the measuring object 1 contribute to the interference signal on one of the detectors 4a through 4d which occur within a coherence length amounting to approximately 20 μm of the focus range adjusted via the reference mirror 11. This way, a range can be adjusted via the reference mirror 11 within which the measuring signals are detected.

The light source 3 creates light having a wave length of approximately 1550 nm. This allows to measure even measuring objects encapsulated in silicon because silicon hardly absorbs any light of this wavelength and suitable optical components are available from fiberglass transmission technology.

The scope of the invention also includes to create the above-described different adjustment ratios between the working beam and the reference beam via chromatic aberrations.

Figure 1B:
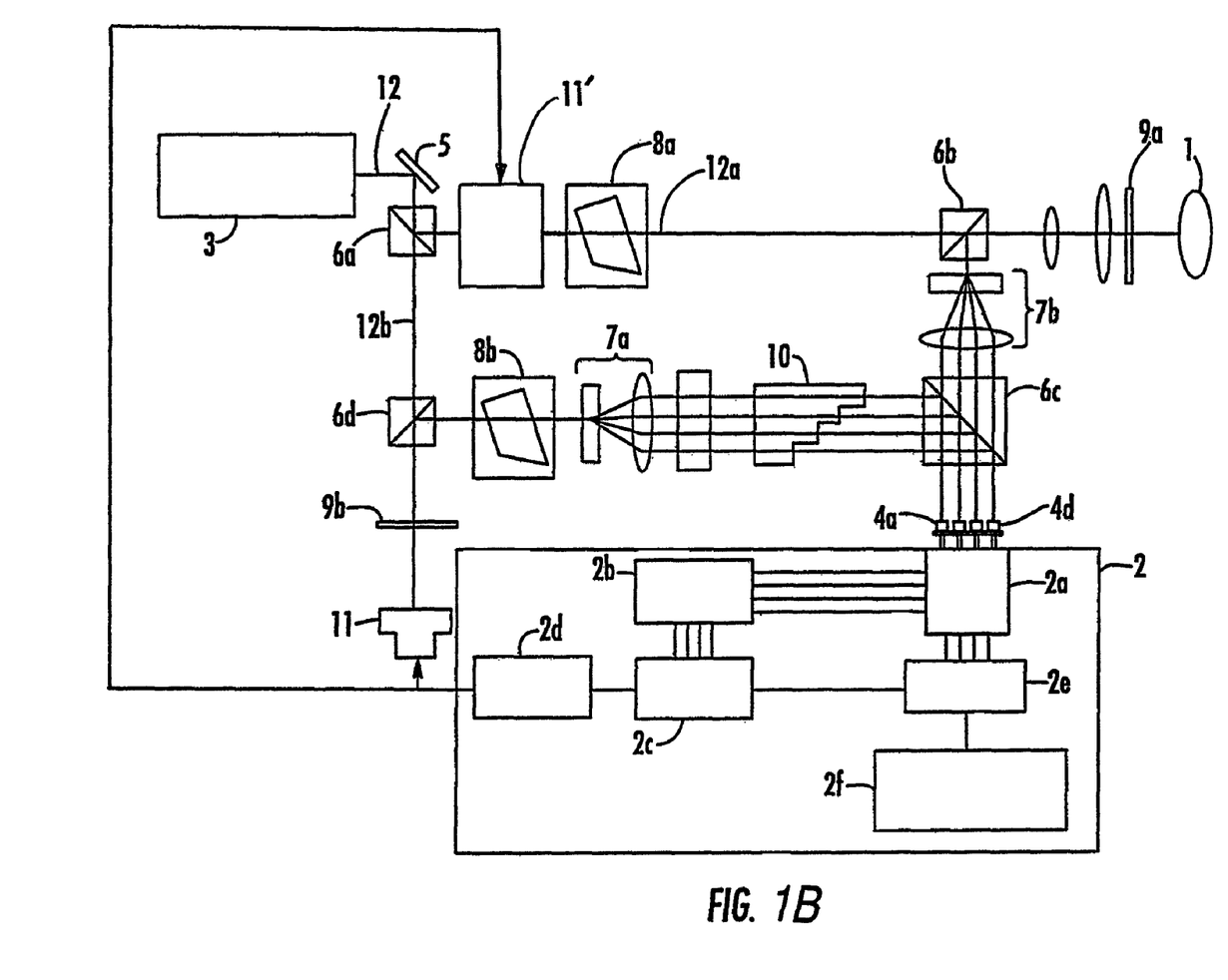
FIG. 1B is a diagram similar to FIG. 1A with an alternate embodiment in which the optic path lengths of the working beam and the measuring beam are changed.
Figure 1C:
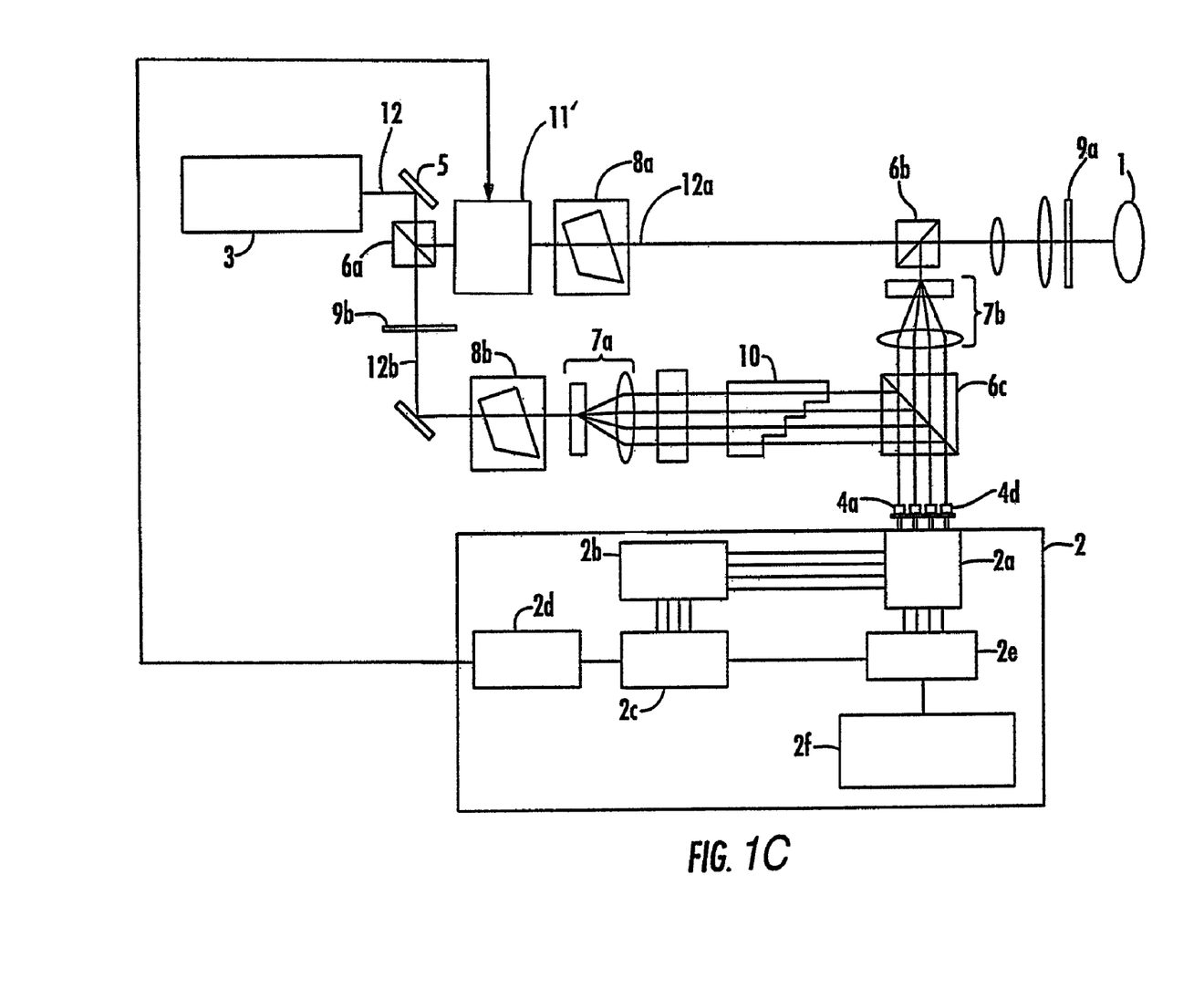
FIG. 1C is a diagram similar to FIG. 1A with an alternate embodiment in which the optic path length of the working beam is changed.

FIGS. 1B and 1C are similar to FIG. 1A, and show alternate embodiments of the device according to the invention. In FIG. 1B both the optical path lengths of the working beam 12a and the reference beam 12b can be adjusted using optical beam path length adjustment devices 11, 11' located in the working beam 12a path and the reference beam 12b path, with the devices being controlled by the focus control 2d. In FIG. 1C, the optical path length of the working beam 12a is adjusted using the optical beam path length adjustment devices 11' located in the working beam 12a path. Operation is the same as in the first embodiment with the working beam and the reference beam being approximately adjusted to each other.

Figure 2:
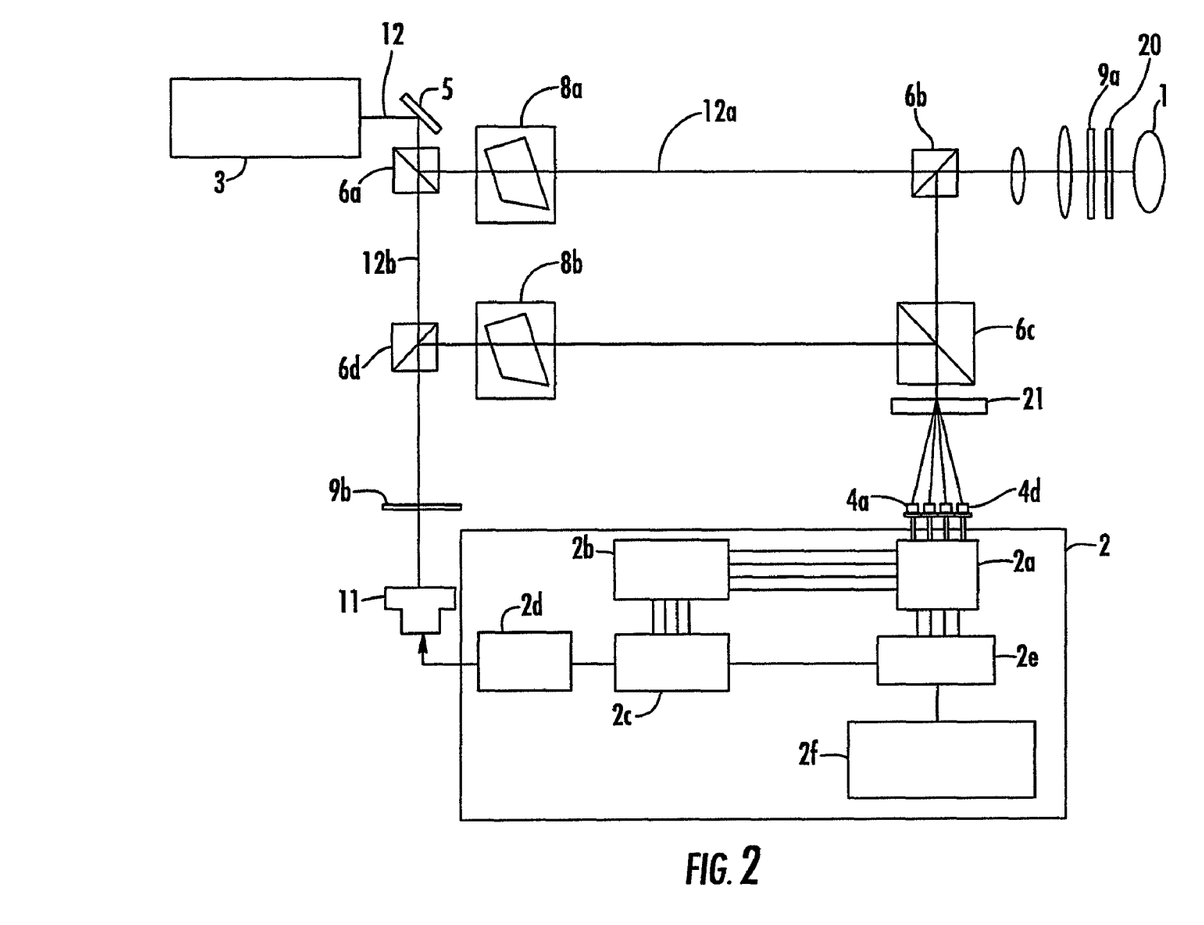
FIG. 2 is a diagram of an exemplary embodiment, in which different adjustment ratios between the working beam and the reference beam is achieved by an optic aberration element.

In FIG. 2 an exemplary embodiment is shown, which in its basic design is identical with the exemplary embodiment shown in FIG. 1A. The measuring and evaluation process also occurs as described above.

An essential difference lies in the working beam and the reference beam not being split via two beam multipliers 7a and 7b as shown in FIG. 1A, and that no optic delay is caused by a delay element 10. Instead the exemplary embodiment in FIG. 2 is provided with an optic aberration element 20 and a translation grid 21.

The working beam 12a passes through the aberration element 20 and subsequently impinges the object 1 to be measured. By the aberration element different foci are created for different wavelengths portions of the working beam, i.e. depending on the wavelength a different focus range can be allocated to the working beam.

Similar to FIG. 1A the working beam, at least partially reflected by the object 1, passes the λ/4 plate 9a and is deflected by the second beam splitter 6b to the third beam splitter 6c.

When passing the third beam splitter 8c the working beam interfered with the reference beam 12b impinges the translation grid 21. Here, different wavelength portions of the interfered working beam and the reference beam are each deflected to one of the detectors 4a and 4d. In FIG. 2, from the total number of 100 detectors, only four are shown as examples.

It is essential that by the translation grid each detector can be allocated to a certain wavelength portion of the interfered working beam and the reference beam, so that based on the different foci of the wavelength portion of the working beam a different adjustment ratio is given between the working beam and the reference beam for each detector.

The general design for creating different adjustment ratios via optic aberration is described in Papasothopoulos, Koerner, Osten "Chromatic Confocal Spectral Interferometry", Applied Optics, Vol. 45, No. 32, 10 Nov. 2006, pp 8244-8252.

The invention claimed is:

1. A device for the optic measuring of an object (1), comprising a signal processing unit (2) as well as an interferometer with a light source (3) and at least one detector (4a, 4d), the interferometer is embodied such that a light beam (12) created by the light source (3) is split at least into a working beam (12a) and a reference beam (12b), with the working beam (12a) adapted to impinge the object (1) and a measurement beam (12a) is reflected at least partially by the object and interfered by the reference beam (12b) on the detector (4a, 4d), the interferometer comprises a heterodyne interferometer having a frequency shift unit (8a, 8d), which is arranged in a beam path of at least one of the working beam (12a) or the reference beam (12b) and is adapted to shift a frequency of the working beam and the reference beam, the signal processing unit (2) is connected to the detector (4a, 4d) and comprises a vibrometer processing unit (2f) comprises a heterodyne vibrometer evaluation unit, which is embodied to determine motion data of the object (1) from measuring signals of the detector (4a, 4d) and also a direction of motion of the object (1), and the signal processing unit (2) is adapted to determine an intensity of the interference signal of the working beam (12a) and the reference beam (12b) from a carrier strength of the heterodyne signal of the detector, the light source (3) produces light with a coherence length shorter than 1 cm and that the device comprises a focus control (2d) and a device (11) for changing the optic path length (11) of the at least one of the working beam or the reference beam, controlled by the focus control, with the device for changing the optic path length (11) being arranged such that the optic path length of at least one of the working beam or the reference beam is changed via the device for changing the optic path length (11) depending on control signals of the focus control and the focus control controls the device for changing the optic path length such that the optic path lengths of the working beam and the reference beam are adjusted to each other.

2. A device according to claim 1, wherein the device for changing the optic path length (11) in the beam path is arranged in the interferometer in the beam path of the reference beam (12b).

3. A device according to claim 1, wherein the focus control is connected to a signal processing unit that is embodied to control the device for changing the optic path length depending on the measurement signal of the detector, and controls the device for changing the optic path length depending on the intensity of the interference signal of the working beam (12a) and the reference beam (12b).

4. A device according to claim 1, wherein the light source (3) is adapted to provide a light beam with a coherence length shorter than 50 μm.

5. A device according to claim 4, wherein the light source (3) is embodied to provide the light beam with a broadband frequency spectrum such that the light beam has a coherence length shorter than 50 μm.

6. A device according to claim 4, wherein the light source (3) is embodied such that it creates a light beam with a time changing phase such that the light beam has a coherence length shorter than 50 μm.

7. A device according to claim 6, wherein the device for changing the optic path length comprises a linearly displaceable optic reference mirror (11) arranged in a path of the reference beam (12a) to shift the reference beam in a direction of the reference beam (12a).

8. A device according to claim 1, wherein the light source (3) provides a light beam with a wavelength longer than 1000 nm.

9. A device according to claim 1, wherein the signal processing unit (2) has a control output, which is connected to the device for changing the optic path length and controls it such that for at least two predetermined optic wavelengths of the reference beam (12a), an intensity of the interference signal of the working beam and the reference beam is determined and for the optic wavelength and a maximum interference signal, the motion data of the object is determined via the vibrometer processing unit (2f) and/or the intensity of the interference signal is saved separately.

10. A device according to claim 1, wherein the interferometer comprises a multi-beam interferometer, provided with a working beam splitter (7b) arranged in a path of the working beam (12b) and embodied such that the beam splitter is adapted to split the working beam into at least two partial beams and a reference beam splitter (7a) is arranged in a path of the reference beam (12a) and is embodied such that the beam splitter is adapted to split the reference beam into at least two partial beams, the interferometer is provided with at least a second detector (4d) and is embodied such that the first working beam is interfered with the first reference beam on the first detector (4a) and the second working beam is interfered with the second reference beam on the second detector (4d), and the signal processing unit (2) is connected both to the first and the second detectors and is adapted to evaluate the measuring signals of both detectors.

11. A device according to claim 10, wherein the interferometer is provided with at least a second device (10) for an optic path length change, which is arranged in a path of a partial reference beam or one of the partial measurement beams.

12. A device according to claim 10, wherein the working beam splitter is arranged in the path of the working beam (12b) between the object (1) an the detector (4a, 4d) such that the working beam impinges the measuring object intact, and that the working beam at least partially reflected from the object is split by the working beam splitter (7b) into partial beams.

13. A device according to claim 12, wherein the second device comprises an optic delay unit (10) for changing the optic path length.

14. A device according to claim 1, further comprising a displacement unit and a scanner control unit, with the scanner control unit cooperating with the displacement unit such that the scanner control unit controls the displacement unit via control signals so that a relative position of the object to be measured and the working beam is changed so that the working beam can be aligned to at least two predetermined, locally different measurement points on the object.

15. A device according to claim 14, wherein the displacement unit comprises an optic deflection unit, which is arranged in a beam path of the working beam between the light source and the object and is adapted to deflect the working beam into at least two predetermined spatial directions such that the working beam impinges at least two locally different predetermined measuring points on the object.

16. A device according to claim 1, wherein the device comprises a confocal microscope having a lens and a spatial filter, with the lens and the spatial filter being arranged in a beam path of the working beam so that non-focal beams impinging the object from points outside a focus of the lens are essentially filtered out by the spatial filter.

17. A device according to claim 1, wherein the focus control controls the device for changing the optic path length such that for several predetermined depths ranges each, the paths of the working beam and the reference beam are adjusted to each other and the device is embodied such that for each predetermined depth range, the intensity of the interference signal of the working beam and the reference beam is evaluated.

* * * * *